United States Patent [19]

Johnson et al.

[11] Patent Number: 4,622,805
[45] Date of Patent: Nov. 18, 1986

[54] AUGER LIFT MECHANISM FOR CROP HARVESTING HEADER

[75] Inventors: Orlin W. Johnson, Lockport; Michael P. Larson, Andover; Richard E. Benson, East Moline; Dathan R. Kerber; Jon R. Cross, both of Bolingbrook, all of Ill.

[73] Assignee: J. I. Case Company, Racine, Wis.

[21] Appl. No.: 758,299

[22] Filed: Jul. 24, 1985

[51] Int. Cl.⁴ .............................................. A01D 47/00
[52] U.S. Cl. ...................................... 56/14.3; 56/220; 56/222
[58] Field of Search ...................... 56/14.3, 14.4, 14.5, 56/14.6, 208, 219, 220, 221, 222, 223, 224, 225, DIG. 20

[56] References Cited

U.S. PATENT DOCUMENTS

| | | | |
|---|---|---|---|
| 1,196,615 | 8/1916 | Thompson | 56/225 |
| 2,518,521 | 8/1950 | Carroll | 56/158 |
| 2,957,296 | 10/1960 | Walters | 56/220 |
| 3,324,639 | 6/1967 | Halls et al. | 56/14.4 |
| 3,530,650 | 9/1970 | Phillips | 56/14.3 |
| 3,733,796 | 5/1973 | Wood et al. | 56/220 |
| 4,296,592 | 10/1981 | McIlwain | 56/14.4 |

FOREIGN PATENT DOCUMENTS 1141125  12/1962  Fed. Rep. of Germany ........ 56/208

Primary Examiner—Gene Mancene
Assistant Examiner—David I. Tarnoff
Attorney, Agent, or Firm—Dressler, Goldsmith, Shore, Sutker & Milnamow, Ltd.

[57] ABSTRACT

A header frame for a combine harvester having a linkage connection between the crop reel and the auger, whereby the auger may be automatically and mechanically raised from the header floor by raising the reel for purposes of unplugging wedged crop material. The linkage includes a lost-motion connection so that the reel can be moved vertically as required during harvesting without affecting the auger, and the auger is also capable of floating action during operation. A sprocket and chain drive for the auger includes a spring-biased idler sprocket for maintaining proper chain tension and uninterrupted operation of the auger at all times. An adjustable wedge is also provided for fixing and limiting the minimum spacing between the auger and the header floor.

12 Claims, 3 Drawing Figures

⇐ (DIRECTION OF TRAVEL)

AUGER LIFT MECHANISM FOR CROP HARVESTING HEADER

TECHNICAL FIELD

This invention relates to grain harvesting implements such as combines, and particularly to the crop consolidating auger contained within the header section of such implements. More specifically, it relates to a mechanism for lifting the auger to permit removal of wedged crop material.

BACKGROUND OF THE INVENTION

Crop harvesting headers ideally are capable of gathering, severing, and consolidating crop material in a smooth, uniform flow despite variations in crop densities and crop types being harvested. As a practical matter, the flow rate through a header cannot be maintained evenly, particularly where crop densities vary within the field being harvested. Unusually heavy stands of crop can create slugs of crop material which can jam or plug the crop consolidating auger of the header.

While there have been prior attempts to cope with the problem, a wholly satisfactory solution has not been forthcoming. Thus, for example, U.S. Pat. Nos. 3,324,639 and 2,518,521 show header augers which are described as being floatably mounted in the header so that slugs of impacted crop material can force the auger to move upwardly. While such an arrangement could be an aid in reducing plugging of the crop consolidating auger, the auger apparently floats only when the underlying crop material has reached a volume or density sufficient to overcome the weight of the auger. Plugging may still result even though the auger has been forced upwardly. If the crop has wedged under the auger, the operator faces the problem of manually digging the compacted crop out from under the auger, which, when plugged, is being supported on the very material to be removed.

An additional means sometimes used to unplug the auger is to manually apply torque either to the end of the auger shaft or to some mechanically advantaged point connected thereto. The auger itself, therefore, adds complexity to the problem of unplugging the header.

There thus exists a need for a simplified and efficient means for freeing the auger of plugged material.

SUMMARY OF THE INVENTION

This invention provides an improved crop harvesting header wherein the crop conveying auger is power-shiftable to a raised position to facilitate the removal of crop material which may have become wedged under the auger. The typical crop harvesting header used in conjunction with combines includes a crop biasing reel which is power-shiftable between raised and lowered positions to suit various crops and harvesting conditions. The present invention uniquely uses the existing reel shift structure by interconnecting it to the auger. This results in a relatively simple and inexpensive system. In a preferred embodiment, the header includes a crop biasing reel which is power-shiftable up and down relative to the header to accommodate varying harvesting conditions. Means are provided to operatively interconnect the reel lifting structure and the auger so that the auger may be lifted in response to lifting the reel. By this arrangement, the auger can be lifted and retained above the crop material which may have become wedged therebeneath. This action concurrently increases the space between the auger and the underlying floor of the header. With the weight of the auger removed or partially removed from the crop material, and with the space between the auger and the header floor being increased, the removal of the wedged crop material is made easier and faster. Moreover, the auger is positively and safely held in a raised position by a mechanical device, unlike the prior art.

The present invention provides an improved crop harvesting header wherein removal of wedged or plugged crop material is made easier and faster. At the same time, the foregoing results are accomplished with a simple and inexpensive structure.

Numerous other advantages and features of the present invention will become readily apparent from the following detailed description of the invention, from the claims, and from the accompanying drawings.

DETAILED DESCRIPTION OF THE INVENTION

Figure 1:
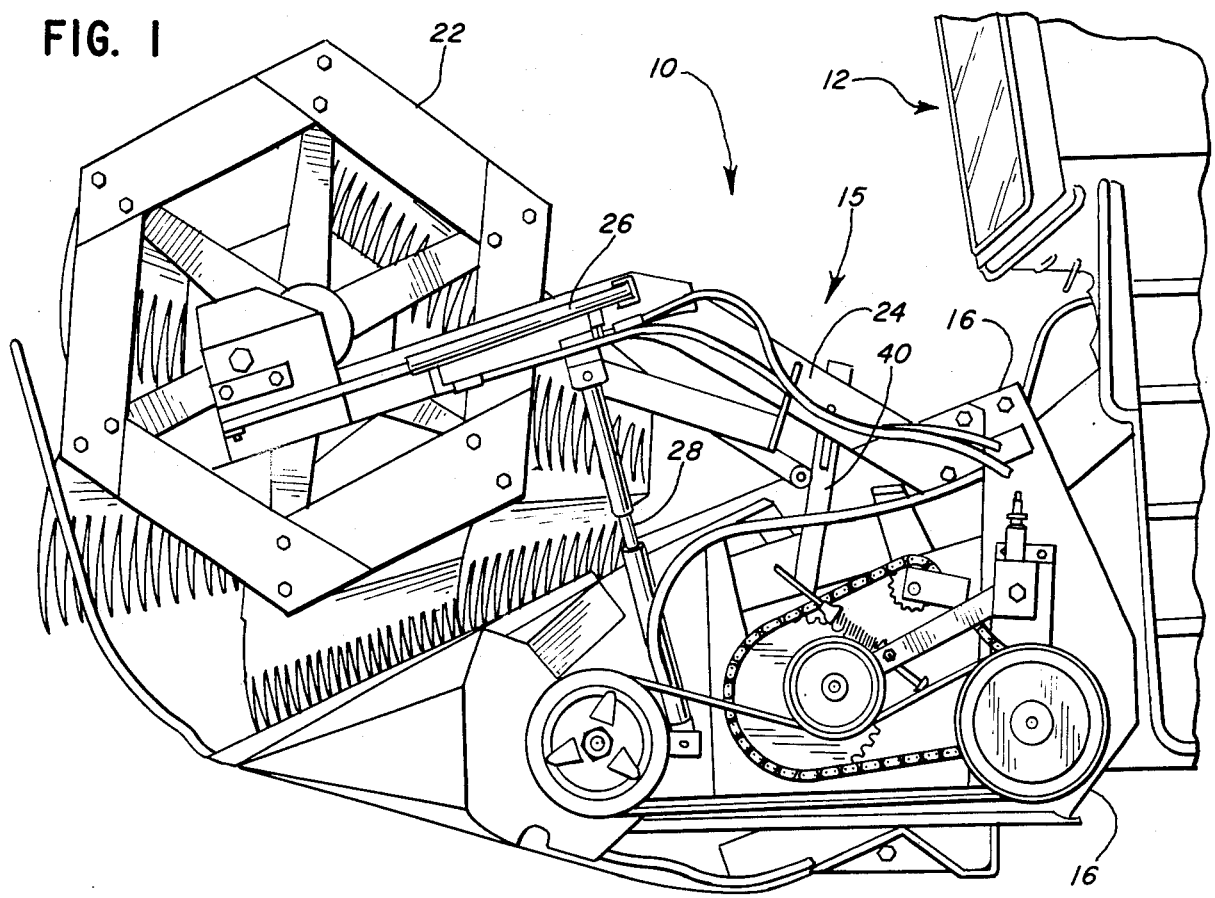
FIG. 1 is a fragmentary elevational view of a combine harvester, and particularly the header section thereof, embodying the principles of the invention.

The present invention relates solely to the auger or feed screw of a combine harvester and the means for lifting the auger when it is desired to dislodge crop material wedged between the auger and the concave platform of the header. Since the remaining portions of the harvester may be considered conventional, only so much thereof as is necessary for an understanding of the invention will be described in detail.

Referring with greater particularity to the various Figures of the drawings, the reference numeral 10 indicates generally a combine harvester, including a self-propelled vehicle 12 to which is attached a header section indicated generally at 15. The header section 15 includes a transverse main frame (not shown), left and right upright side walls 16 and 18, and a concave trough or platform 20 onto which the severed crops are deposited (see FIG. 3).

A revolving crop reel 22 spans the width of the header 12 between the side walls 16 and 18 and is adapted to rake the standing crop toward a reciprocating cutter blade (not shown) and the trough 20 in a conventional manner. The reel 22 is pivotally supported on the side walls 16 and 18 by a pair of longitudinal support arms 24, 24. The arms 24 carry hydraulic cylinder-piston means 26 for adjusting the fore and aft position of the reel 22. Hydraulic cylinder-piston means 28 pivotally connected between the sidewalls 16 and 18 and the arms 24 are provided for adjusting the vertical position of the reel. When the cylinder-piston means 28 are fully extended, the reel 22 is in the fully upraised and inoperative position shown in FIG. 3 of the drawings.

An auger 30 is likewise positioned between the side walls 16 and 18 and in spaced relation with the trough 20. However, the end shafts of the auger 30 are not journalled in or supported by the walls 16 and 18, but instead pass through enlarged openings 19 formed in said walls. The auger end shafts are rotatably journalled in auger support members 35, 35. Auger support member 35 comprises a relatively shallow housing 36 of generally trapezoidal configuration, and said housing is pivotally mounted as at 38 to its respective side wall. It will thus be noted that pivoting of the support members 35 about their pivot points 38 results in concomitant movement of the auger 30 in a substantially vertical plane to thereby change the spacing between the auger and the trough 20.

A link 40 is pivotally connected at one end thereof to each of the support members 35. Adjacent its opposite end, the link 40 is formed with an elongated slot 42, and said slot slidably accommodates therethrough a headed pin 44 projecting from the reel support arm 24. The linkage of the auger support members 35 to the reel support arms 24 is thus effected by means of a lost-motion connection. It is important to note that the slot 42 is of sufficient length so that when the cylinder-piston 28 is fully retracted and the reel 22 is in its lowermost operational position, the pin 44 occupies an intermediate position in the slot 42 (see dotted showing in FIG. 3). In that condition, the auger 30 is in its closest relationship to the trough 20; however, the auger is nonetheless capable of some floating movement to the extent of the bottom of the slot 42.

If it is desired to raise the reel 22 during harvesting operations, the lost-motion connection permits such raising without movement of the auger 30 until the pin 44 reaches the top of the slot 42. When raising of the auger is desired, as for purposes of dislodging wedged crop material, the reel 22 is simply raised to its uppermost inoperative position (see solid line showing in FIG. 3). In most instances, it has been found that continued operation of the auger in the fully upraised position is automatically effective by itself to unplug the wedged material, thereby avoiding the hazard of the operator attempting to manually dislodge such material.

Figure 2:
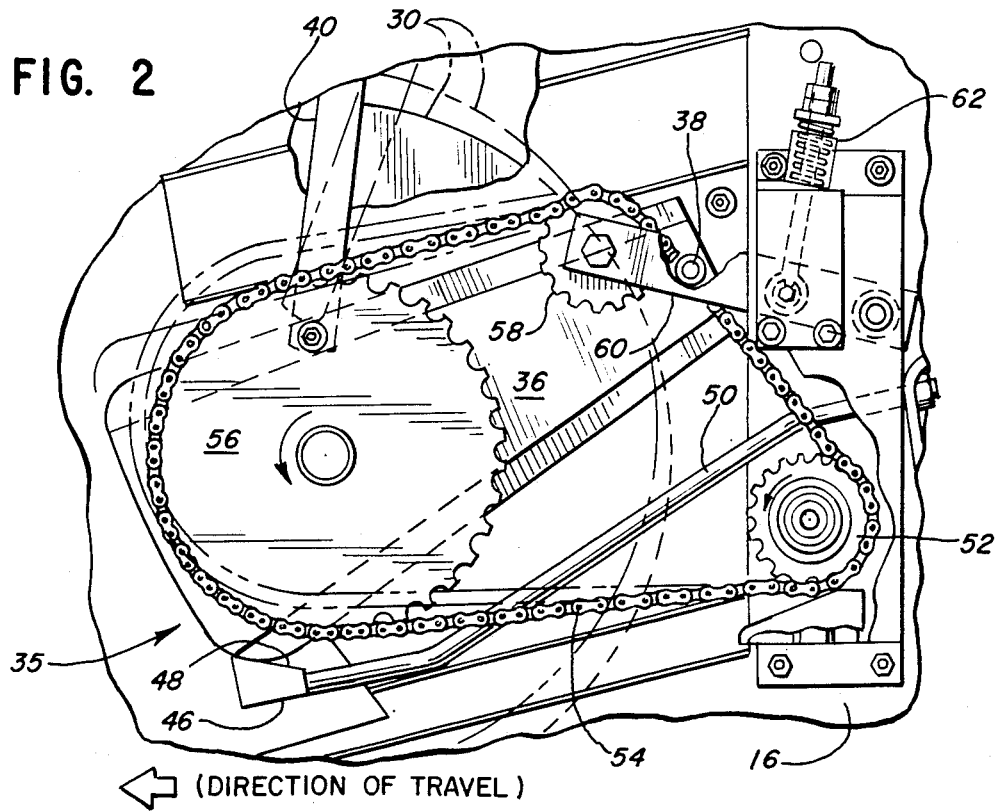
FIG. 2 is an enlarged fragmentary elevational view, with portions broken away, showing the drive means for the auger.
Figure 3:
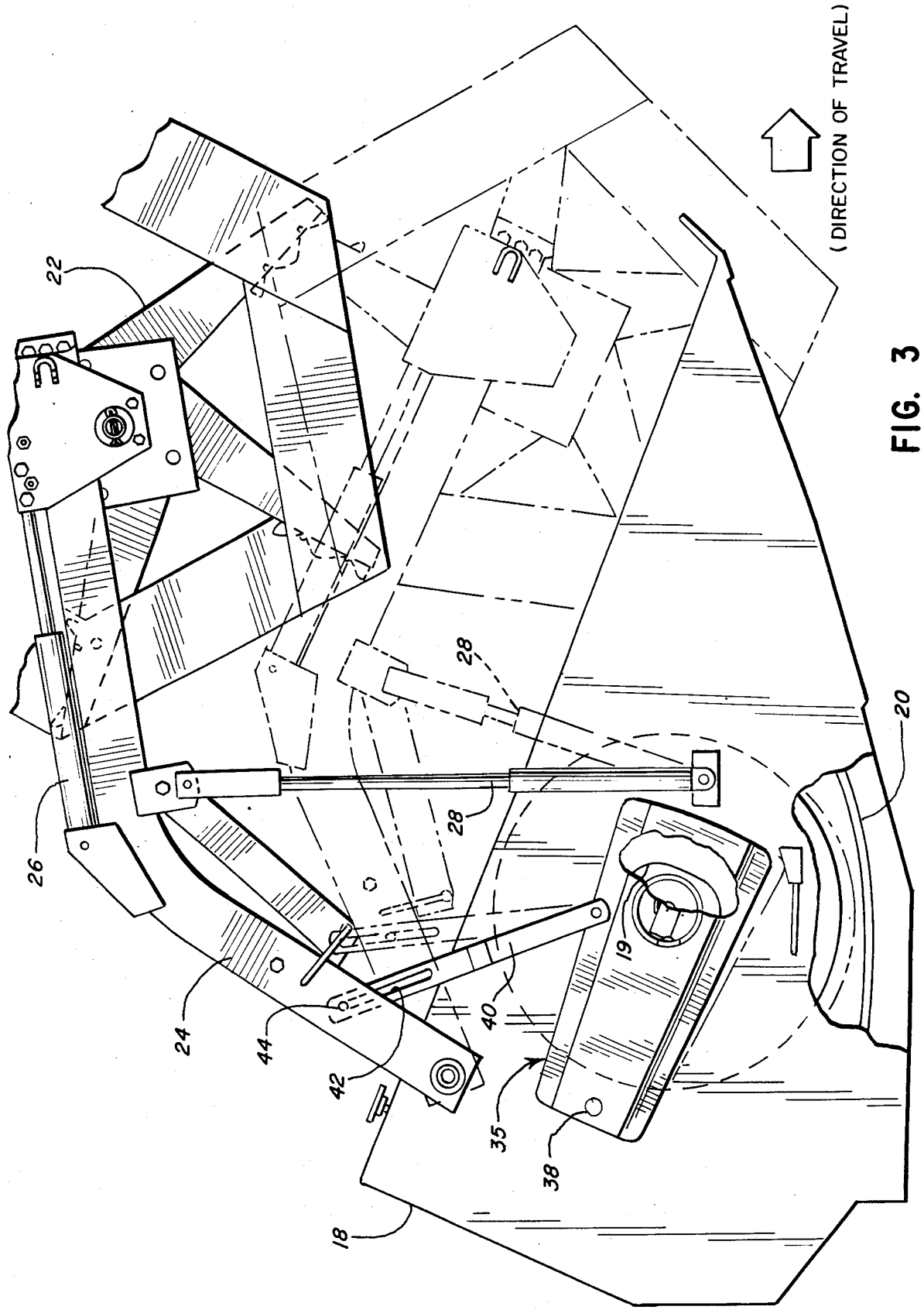
FIG. 3 is an enlarged fragmentary elevational view of the opposite side of the header section.

An adjustment wedge 46 having an angled face 48 and a variable length arm 50 is mounted on the side walls 16 and 18 in association with the auger support members 35, as shown in FIGS. 2 and 3. By suitable adjustment of the wedges 46, the minimum distance between the auger 30 and trough 20 may be adjusted and fixed.

Referring specifically to FIG. 2 of the drawings, it will be seen that the drive means for the auger 30 comprises a fixed drive sprocket 52, connected by a chain 54 to a driven sprocket 56 rigidly mounted on the left shaft 50 of the auger. An idler sprocket 58 is rotatably carried on a pivot bar 60 pivotally mounted on the side wall 16, and the chain 54 is trained over said idler sprocket. Adjustable spring means 62 is pivotally connected to the pivot bar 60 for adjusting the tension on the idler sprocket 58. When movement of the auger support member 35 causes a change in the effective distances between the axes of rotation of the drive and driven sprockets 52 and 56, the spring-urged idler sprocket 58 insures the maintenance of proper tension on the chain 54 and uninterrupted operation of the auger 30.

It will be readily observed from the foregoing detailed description of the invention and illustrative embodiment thereof that numerous variations and modifications may be effected by those skilled in the art without departing from the true spirit and scope of the novel concept of the principles of the invention.

What is claimed is:

1. In a crop harvesting header having a frame and a floor upon which crop material is conveyed:
   a crop conveying auger mounted on the header frame in spaced relation above the header floor for conveying crop material between the auger and the floor;
   means mounting said auger on the frame for movement toward and away from the header floor to vary the crop conveying space therebetween;
   a reel mounted on the header frame for conveying crop material toward said auger;
   means mounting said reel for up and down movement relative to the frame; and
   means operatively connected between said reel and auger for automatically lifting said auger responsive to moving said reel, whereby the crop conveying space between the auger and header floor is increased to assist in clearing crop material plugged in the crop conveying space.

2. In the crop harvesting header of claim 1, said last-mentioned means comprising a lost-motion connection between said reel and auger enabling limited movement of the reel to adjust for varying harvesting conditions without imparting movement to the auger, whereby the auger is lifted only when the reel is moved beyond the limits of the lost-motion connection.

3. In the crop harvesting header of claim 2, said lost-motion connection comprising a link having an elongated slot formed therein.

4. In the crop harvesting header of claim 1, sprocket and chain means operatively connecting said auger to a fixed drive shaft and a spring-biased idler sprocket engaging said chain, whereby operational connection of said auger to said drive shaft is maintained during lifting of said auger.

5. In the crop harvesting header of claim 1, said first-mentioned means comprising a support housing pivotally mounted on opposite sides of said frame, said auger being rotatably journalled in said support housings.

6. In the crop harvesting header of claim 5, adjustable wedge means cooperating with said support housings for limiting the minimum distance between said auger and said floor.

7. A crop harvesting header comprising:
   a frame having a pair of forwardly extending end walls and a floor extending therebetween upon which crop material is conveyed;
   a crop conveying auger disposed in spaced relation above the header frame for conveying crop material between the auger and the floor;
   drive means on the header frame for rotating said auger;
   means mounting said auger between said end walls for movement toward and away from the header floor to vary the crop conveying space therebetween, said means including a pair of auger support members pivotally mounted on the respective end walls, said auger being journalled at its opposite ends in the respective auger support members;
   a crop engaging reel mounted on the header frame for conveying crop material toward said auger, said reel being journalled on a pair of reel support arms pivotally mounted on said header frame proximate to the respective end walls;
   hydraulic cylinder means operatively interconnected between the end walls and the respective reel support arms for raising and lowering the reel to adjust for varying harvesting conditions; and link means operatively interconnected between the auger support members and the respective reel support arms, whereby the crop conveying space between the auger and the header floor is automatically increased by raising the reel.

8. A crop harvesting header according to claim 7 wherein said link means comprises a rigid link having an elongated slot therein, said reel support arm being slidably engaged in said link slot in a lost-motion connection, whereby the auger is raised when the reel is moved beyond the limits of said lost-motion connection.

9. A crop harvesting header according to claim 8 wherein said drive means comprises a fixed drive shaft carrying a drive sprocket, a driven sprocket rigidly mounted on an associated end of the auger, a chain operatively connecting said drive and driven sprockets, and means for maintaining operating tension of said chain during movement of the auger.

10. A crop harvesting header according to claim 9 wherein said last-mentioned means comprises a spring-biased idler sprocket pivotally mounted on the associated frame end wall so that the idler sprocket is in constant engagement with said chain.

11. A crop harvesting header according to claim 8 wherein said auger support members comprise shallow trapezoidal housings, said housings covering enlarged openings in said frame end walls accommodating the ends of said auger therethrough.

12. A crop header according to claim 11 comprising adjustable wedge means cooperating with said auger support members for limiting the minimum crop conveying space between said auger and said floor.

* * * * *